(12) United States Patent
Kim et al.

(10) Patent No.: US 8,173,298 B2
(45) Date of Patent: *May 8, 2012

(54) ELECTROLYTE FOR LITHIUM BATTERY AND LITHIUM BATTERY COMPRISING SAME

(75) Inventors: Jun-Ho Kim, Yongin-si (KR);
Ha-Young Lee, Yongin-si (KR);
Sang-Hoon Choy, Yongin-si (KR);
Ho-Sung Kim, Yongin-si (KR);
Hyeong-Gon Noh, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/033,517

(22) Filed: Feb. 23, 2011

(65) Prior Publication Data

US 2011/0151337 A1 Jun. 23, 2011

Related U.S. Application Data

(62) Division of application No. 12/499,238, filed on Jul. 8, 2009, now Pat. No. 7,914,928, which is a division of application No. 11/714,197, filed on Mar. 6, 2007, now Pat. No. 7,618,749, which is a division of application No. 10/393,294, filed on Mar. 21, 2003, now Pat. No. 7,205,073.

(30) Foreign Application Priority Data

Apr. 3, 2002 (KR) .................. 10-2002-0018264

(51) Int. Cl.
*H01M 6/04* (2006.01)
(52) U.S. Cl. ........ 429/199; 429/200; 429/326; 429/327; 429/317; 429/307; 429/330; 429/331; 429/332; 429/334; 429/336; 429/340; 429/341; 252/62.2
(58) Field of Classification Search .................. 429/199, 429/200, 326, 327, 317, 307, 330, 331, 332, 429/334, 336, 340, 341; 252/62.2
See application file for complete search history.

(56) References Cited

U.S. PATENT DOCUMENTS

| | | | |
|---|---|---|---|
| 5,709,968 A | 1/1998 | Shimizu | |
| 5,879,834 A | 3/1999 | Mao | |
| 6,146,790 A | 11/2000 | Omaru et al. | |
| 6,632,572 B1 | 10/2003 | Takahashi et al. | |
| 6,852,450 B2 | 2/2005 | Hwang et al. | |
| 6,913,856 B2 * | 7/2005 | Nirasawa et al. | 429/340 |
| 6,919,143 B2 | 7/2005 | Hwang et al. | |
| 7,105,250 B2 | 9/2006 | Kim et al. | |
| 7,205,073 B2 * | 4/2007 | Kim et al. | 429/307 |
| 7,223,501 B2 | 5/2007 | Jung et al. | |
| 7,425,388 B2 | 9/2008 | Park et al. | |
| 2001/0009744 A1 | 7/2001 | Kim et al. | |
| 2002/0102466 A1 | 8/2002 | Hwang et al. | |
| 2003/0157411 A1 | 8/2003 | Jung et al. | |
| 2004/0048163 A1 | 3/2004 | Park et al. | |

FOREIGN PATENT DOCUMENTS

| | | |
|---|---|---|
| CN | 1279520 | 1/2001 |
| JP | 09-022722 | 1/1997 |
| JP | 10-189044 | 7/1998 |
| JP | 11-329496 | 11/1999 |
| JP | 2000-106209 | 4/2000 |
| JP | 2001-223024 | 8/2001 |
| JP | 2001-338684 | 12/2001 |
| WO | WO 01/22519 A1 | 3/2001 |

OTHER PUBLICATIONS

Structure abstracts corresponding to U.S. Patent No. 6,852,450 and U.S. Publication 2002/0102466, 6 pps.

* cited by examiner

*Primary Examiner* — Laura Weiner
(74) *Attorney, Agent, or Firm* — Christie, Parker & Hale, LLP

(57) ABSTRACT

An electrolyte for a lithium battery includes a non-aqueous organic solvent, a lithium salt, and an additive comprising a) a compound represented by the following Formula (1), and b) a compound selected from the group consisting of a sulfone-based compound, a poly(ester)(metha)acrylate, a polymer of poly(ester)(metha)acrylate, and a mixture thereof:

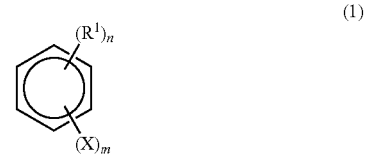

(1)

wherein $R^1$ is a $C_1$ to $C_{10}$ alkyl, a $C_1$ to $C_{10}$ alkoxy, or a $C_6$ to $C_{10}$ aryl, and preferably a methyl, ethyl, or methoxy, X is a halogen, and m and n are integers ranging from 1 to 5, where m+n is less than or equal to 6.

7 Claims, 7 Drawing Sheets

ELECTROLYTE FOR LITHIUM BATTERY AND LITHIUM BATTERY COMPRISING SAME

CROSS REFERENCE TO RELATED APPLICATION

This application is a divisional of U.S. patent application Ser. No. 12/499,238 filed Jul. 8, 2009 which issued on Mar. 29, 2011 as U.S. Pat. No. 7,914,928, which is a divisional of U.S. patent application Ser. No. 11/714,197 filed Mar. 6, 2007 which issued on Nov. 17, 2009 as U.S. Pat. No. 7,618,749, which is a divisional of U.S. patent application Ser. No. 10/393,294 filed Mar. 21, 2003 which issued on Apr. 17, 2007 as U.S. Pat. No. 7,205,073, which claims priority to and the benefit of Korean Patent Application No. 10-2002-0018264 filed in the Korean Intellectual Property Office on Apr. 3, 2002, the disclosure of which is incorporated herein by reference.

FIELD OF THE INVENTION

The present invention relates to an electrolyte for a lithium battery and a lithium battery comprising the same, and more particularly, to an electrolyte for a lithium battery to reduce overcharge and improve electrochemical characteristics of the battery, and a lithium battery comprising the same.

BACKGROUND OF THE INVENTION

The use of portable electronic instruments is increasing as electronic equipment gets smaller and lighter due to developments in high-tech electronic industries. Studies on lithium secondary batteries are actively being pursued in accordance with the increased need for a battery having high energy density for use as a power source in these portable electronic instruments. Such a lithium secondary battery, having an average discharge potential of 3.7 V (i.e., a battery having substantially a 4 V average discharge potential) is considered to be an essential element in the digital generation since it is an indispensable energy source for portable digital devices such as cellular telephones, notebook computers, camcorders, etc. (i.e., the "3C" devices).

Also, there has been extensive research on batteries with effective safety characteristics such as preventing overcharge. When a battery is overcharged, an excess of lithium ions is deposited on a positive electrode, and an excess of lithium ions is also inserted into a negative electrode to make the positive and negative electrodes thermally unstable. An eruptive explosion occurs from a decomposition of the electrolytic organic solvent, and the thermal runaway that occurs causes serious problems of battery safety.

To overcome the above problems, it has been suggested that an aromatic compound such as an oxidation-reduction additive agent ("redox shuttle") be added to the electrolyte. For example, U.S. Pat. No. 5,709,968 discloses a non-aqueous lithium ion secondary battery to prevent thermal runaway resulting from overcharge current by using a benzene compound such as 2,4-difluoroanisole. U.S. Pat. No. 5,879,834 discloses a method for improving battery safety by using a small amount of an aromatic compound such as biphenyl, 3-chlorothiophene, furan, etc. which is polymerized electrochemically to increase the internal resistance of a battery during unusual overvoltage conditions. Such redox shuttle additives increase the temperature inside the battery early due to heat produced by the oxidation-reduction reaction, and close pores of a separator through quick and uniform fusion of the separator to inhibit an overcharge reaction. The polymerization reaction of these redox shuttle additives consumes the overcharge current to improve battery safety.

However, the polymerization of these redox shuttle additives cannot sufficiently eliminate the overcharge current. In addition, decomposition of the additives causes gas generation inside the battery, and thus, a certain plane of the battery swells. Therefore, improvements in the safety of the battery are limited when using the redox shuttle additives. Additionally, some redox shuttle additives have a deleterious effect on electrochemical properties such as high temperature or cycle life characteristics.

For solving the swelling phenomenon from gas generation inside the battery, a method has been disclosed in which the safety of a secondary battery including a non-aqueous electrolyte is improved by mounting a vent or a current breaker for ejecting an internal electrolyte solution when the internal pressure is increased above a predetermined level. However, a problem with the disclosed method is that the battery may operate incorrectly because of an increase in internal pressure itself.

SUMMARY OF THE INVENTION

To solve the problems stated above, it is an aspect of the present invention to provide a lithium battery electrolyte that improves safety and electrochemical properties of the battery.

It is another aspect of the present invention to provide a lithium battery that incorporates effective safety and electrochemical properties.

To accomplish the aspects of the present invention, the present invention provides an electrolyte for a lithium battery, wherein the electrolyte includes a lithium salt, a non-aqueous organic solvent, and an additive comprising a) a compound represented by the following Formula (1), and b) a compound selected from the group consisting of a sulfone-based compound, a poly(ester)(metha)acrylate, a polymer of a poly(ester)(metha)acrylate, and a mixture thereof:

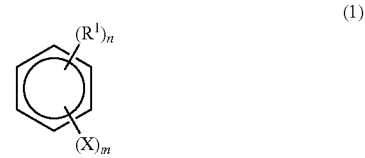

(1)

wherein $R^1$ is a $C_1$ to $C_{10}$ alkyl, a $C_1$ to $C_{10}$ alkoxy, or a $C_6$ to $C_{10}$ aryl, and preferably a methyl, ethyl, or methoxy, X is a halogen, and m and n are integers ranging from 1 to 5, where m+n is less than or equal to 6.

The present invention further provides a lithium battery including the electrolyte.

Other features and/or advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

DETAILED DESCRIPTION OF THE INVENTION

In the following detailed description, the following embodiments of the invention have been shown and described, simply by way of illustration of the best mode contemplated by the inventors of carrying out the invention. As will be realized, the invention is capable of modification in various respects, all without departing from the invention. Accordingly, the drawings and description are to be regarded as illustrative in nature, and not restrictive.

Figure 1:
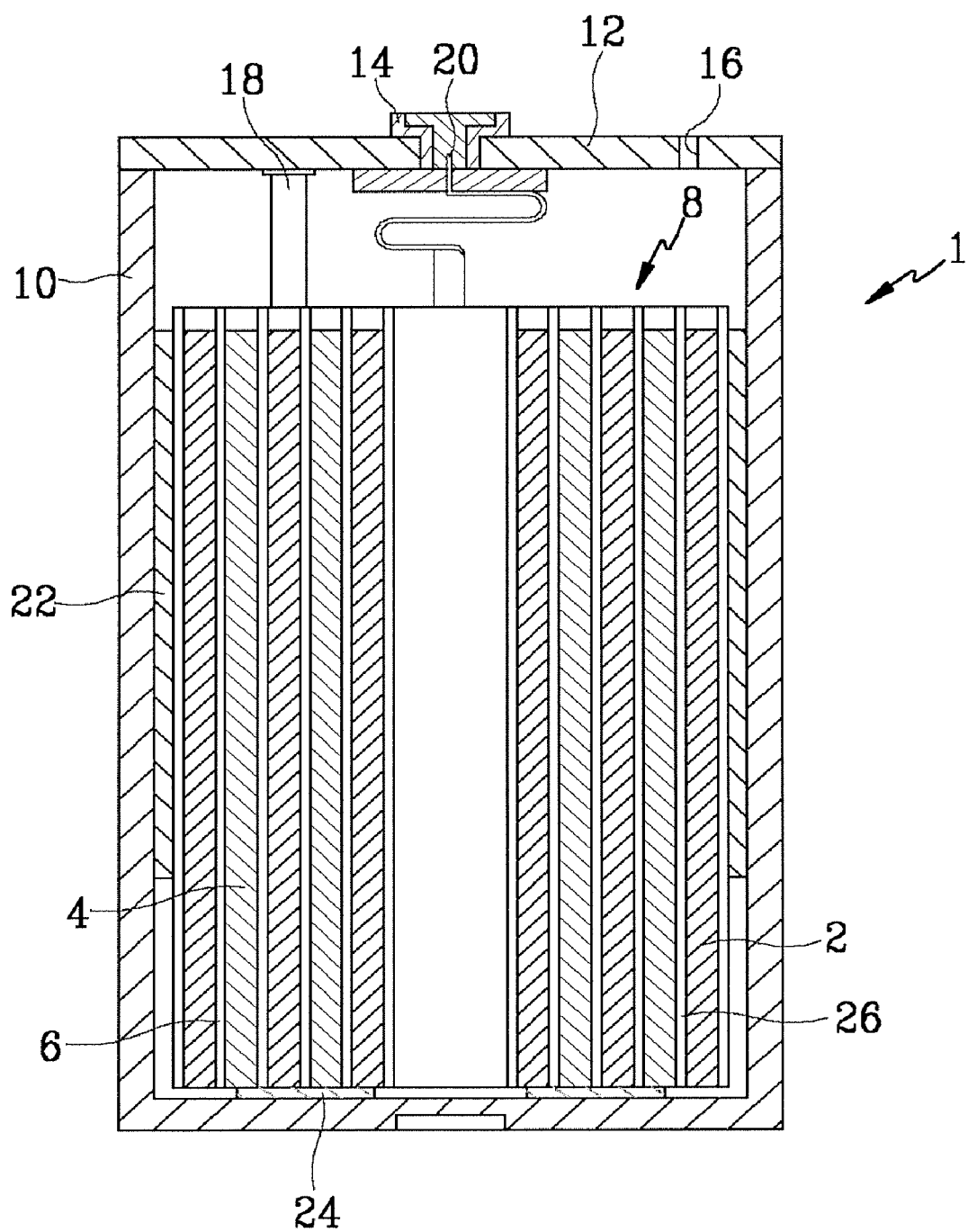
FIG. 1 is a cross-sectional view of a lithium secondary battery cell.

A cross-sectional view of a general non-aqueous Li-ion cell is shown in FIG. 1. The Li-ion cell 1 is fabricated by inserting an electrode assembly 8 including a positive electrode 2, a negative electrode 4, and a separator 6 between the positive and negative electrodes into a battery case 10. An electrolyte 26 is injected into the battery case 10 and impregnated into the separator 6. The upper part of the case 10 is sealed with a cap plate 12 and a sealing gasket 14. The cap plate 12 has a safety vent 16 to release pressure. A positive electrode tab 18 and a negative electrode tab 20 are respectively attached on the positive electrode 2 and negative electrode 4. Insulators 22 and 24 are installed on the lower part and the side part of the electrode assembly 8 to prevent a short circuit occurrence in the battery.

In a lithium battery, the temperature of the battery increases abruptly because of overcharge due to incorrect operation or break-down of the battery, or a short circuit occurrence due to a defect in battery design, so that thermal runaway takes place. During overcharge, an excessive amount of lithium ions are released from the positive electrode and deposited on the surface of the negative electrode to render the positive and negative electrodes unstable. As a result, exothermic reactions such as pyrolysis of an electrolyte, reactions between the electrolyte and lithium, an oxidation reaction of the electrolyte on the positive electrode, a reaction between the electrolyte and oxygen gas that is generated from the pyrolysis of the positive active material, etc., rapidly increase the temperature inside the battery to cause thermal runaway, and thus, the generation of fire and smoke.

An electrolyte of the present invention improves the safety of a battery during overcharge and inhibits swelling of the battery resulting from gas generation by using an additive comprising a) a compound represented by the following Formula (1), and b) a compound selected from the group consisting of a sulfone-based compound, a poly(ester)(metha)acrylate, a polymer of a poly(ester)(metha)acrylate, and a mixture thereof:

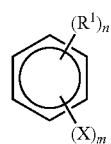
(1)

wherein $R^1$ is a $C_1$ to $C_{10}$ alkyl, a $C_1$ to $C_{10}$ alkoxy, or a $C_6$ to $C_{10}$ aryl, and preferably a methyl, ethyl, or methoxy, X is a halogen, and m and n are integers ranging from 1 to 5, where m+n is less than or equal to 6.

The first compound a) represented by Formula (1) initiates polymerization at more than 4.5 V, and forms a coating layer on a surface of the electrode to decrease internal resistance between the positive and the negative electrodes. The coating layer formed through polymerization of the compound of Formula (1) has both ion conductivity and electric conductivity to facilitate the shunting effect (soft short) between the positive and the negative electrodes. The shunting effect can consume an overcharge current of about 950 mA (1 C) and inhibit a voltage increase to prevent thermal explosion. The coating layer also inhibits short circuits resulting from separator fusion and hole generation of the separator by an overcharge current of about 1900 mA (2 C).

The conventional redox shuttle additive causes closing of the pores of the separator by initially increasing the battery temperature with heat generated during the oxidation-reduction reaction. To the contrary, the additive of the present invention consumes the overcurrent by forming a polymerization coating layer with ionic/electric conductivity, and inhibits an increase of battery potential.

Exemplary compounds represented by Formula (1) preferably include a 3-haloanisole such as 3-fluoroanisole, 3-chloroanisole, 3-bromoanisole, etc., 4-fluoroanisole, 4-chloroanisole, 4-bromoanisole, 2,4-difluoroanisole, 3,5-difluoroanisole, 3-chloro-5-fluoroanisole, and the like, wherein the 3-haloanisole is most preferred.

The compound additive represented by Formula (1) is added in an amount of 0.1 to 50 wt %, preferably 1 to 10 wt %, and more preferably 2 to 7 wt % based on the total amount of the electrolyte. The addition effect is not realized sufficiently when the compound is used in an amount of less than 0.1 wt %, and the cycle life characteristics of the battery are decreased when the compound is used in an amount exceeding 50 wt %.

The second additive compound b) is selected from the group consisting of a sulfone-based compound, a poly(ester)(metha)acrylate, a polymer of a poly(ester)(metha)acrylate, and a mixture thereof.

The sulfone-based compound is represented by one of the following Formulas (2) to (4):

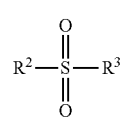
(2)

where $R^2$ and $R^3$ are independently selected from the group consisting of a primary, secondary or tertiary alkyl group, an alkenyl group, and an aryl group; and preferably a $C_1$ to $C_4$ alkyl, a $C_2$ to $C_4$ alkenyl, or a $C_6$ to $C_{14}$ aryl,

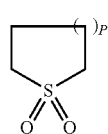
(3)

where p is from 0 to 3,

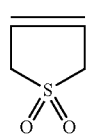

(4)

Specific examples of a sulfone-based compound preferably include methyl sulfone, vinyl sulfone, phenyl sulfone, benzyl sulfone, tetramethylene sulfone, and butadiene sulfone.

A sulfone-based compound is added to a non-aqueous solvent in an amount of 0.01 to 10 wt %, preferably 0.1 to 5 wt %, more preferably 0.2 to 1 wt % of the total amount of the electrolyte. The addition effect of the compound is not realized sufficiently when the sulfone-based compound is used in an amount of less than 0.1 wt %, and the capacity characteristics of the battery are decreased when the sulfone-based compound is used in an amount exceeding 10 wt %.

The poly(ester)(metha)acrylate is a polymer derived from a (polyester)polyol with at least three hydroxyl (—OH) groups where a portion of, or the whole of, the hydroxyl groups is substituted with (metha)acrylic ester, and the remaining portion of the hydroxyl group that is unsubstituted with (metha)acrylic ester is substituted with a group having no radical reactivity. The poly(ester)(metha)acrylate may form a polymer electrolyte with a gellization reaction.

The poly(ester)(metha)acrylate is obtained from a (polyester)polyol with at least three hydroxyl groups. The poly(ester)(metha)acrylate obtained from (polyester)polyol with less than three hydroxyl groups forms a dense and sticky electrolyte to decrease the mobility of the lithium ions. This decrease of lithium ion mobility deteriorates battery performance at a high rate and low temperature performance, decreases the cycle life characteristics, etc.

When a poly(ester)(metha)acrylate prepared by substituting the whole of the hydroxyl groups of the (polyester)polyol with a (metha)acrylic ester is used as the electrolytic additive, structural steric hindrance occurs during the gellization reaction to form the polymer electrolyte, and therefore, an unreacted acrylate group remains in the resultant polymer electrolyte. The unreacted acrylate group has a very strong reactivity, which deteriorates high rate performance or low temperature characteristics.

For a polymer electrolyte, it is preferable to use a poly(ester)(metha)acrylate derived from a (polyester)polyol with at least three hydroxyl (—OH) groups, where a portion of the hydroxyl groups is substituted with a (metha)acrylic ester, and the remaining portion of the hydroxyl groups that is unsubstituted with a (metha)acrylic ester is substituted with a group having no radical reactivity.

As the (polyester)polyol, any (polyester)polyol with at least three hydroxyl groups may be used, regardless of the synthesis method, and these may be available commercially. Specific examples of the (polyester)polyol are a trialkylol such as trimethylol, triethylol, and tripropylol, various glycerols, and erythritols, such as pentaerythritol, dipentaerythritol, etc.

The substitution of the hydroxyl group of the (polyester)polyol with the (metha)acrylic ester can be performed using general esterification.

In general esterification, there is a condensation reaction wherein a (polyester)polyol and a (metha)acrylic acid or a derivative thereof (for example, a halogenized (metha)acrylic acid) is reacted under a base catalyst, and a condensation reaction wherein a (polyester)polyol and (metha)acrylic acid, or a derivative thereof (for example, a halogenized (metha)acrylic acid), is reacted under an acid catalyst, etc. However, another method of synthesizing a poly(ester)(metha)acrylate from a (polyester)polyol and (metha)acrylic acid or a derivative thereof can be used.

An amount of the (metha)acrylic acid or derivative thereof is varied according to the number of moles of the hydroxyl group of the (polyester)polyol, and it is preferable to use about 1 mole of (metha)acrylic acid or a derivative thereof per 1 mole of (polyester)polyol. According to the preferred Example, 0.1 to 10 moles of (metha)acrylic acid or a derivative thereof is used on the basis of 1 mole of (polyester)polyol.

The poly(ester)(metha)acrylate or polymer thereof prepared by the esterification can improve performance of a polymer electrolyte by controlling the functionality of the terminal group. The functionality of the terminal group is determined by the ratio of (metha)acrylic acid or derivative thereof which substitutes the terminal group with an acrylate group, and a carbonyl or halogen compound which substitutes the terminal group with a group having no radical reactivity. The carbonyl or halogen compound has $C_1$ to $C_{20}$ aliphatic hydrocarbons, $C_5$ to $C_{20}$ aromatic hydrocarbons, $C_1$ to $C_{20}$ ethers, or $C_1$ to $C_{20}$ esters. For example, (metha)acrylic acid or a derivative thereof and a carbonyl or halogen compound is preferably used in an amount ratio of 1:0 to 1:10. When the amount ratio is 1:0, a poly(ester)(metha)acrylate wherein all hydroxyl groups of (polyester)polyol are substituted with acrylate groups is prepared. When the amount ratio is out of the range of 1:10, the acrylate group for the crosslinking reaction is too limited to form an appropriate polymer electrolyte.

A base catalyst used for the esterification reaction is an organic salt such as triethylamine, pyridine, dimethylaminepyridine, etc., or an inorganic salt such as lithium carbonate, potassium carbonate, lithium hydroxide, sodium hydroxide, etc. The base catalyst is used in an amount of 0.0001 to 0.01 parts by weight on the basis of 1 part by weight of the total reaction material. An acid catalyst used for the esterification reaction is (metha)acrylic acid, sulfuric acid, hydrochloric acid, phosphoric acid, etc.

(Polyester)polyol may be modified by ring-opening polymerization with lactone before the esterification. The ring-opening polymerization with lactone makes the length of hydroxyl group controllable and modifies the resulting polymer electrolyte.

Specific examples of the lactone are ε-caprolactone, γ-caprolactone, etc. Lactone can be used in any ratio on the basis of total number of hydroxyl groups, and the amount of lactone is not particularly limited. In one preferred example, lactone is used in an amount of less than 10 moles, more preferably 0.01 to 10 moles per 1 mole of the total hydroxyl group of (polyester)polyol, considering the solubility and molecular size of the substituted (polyester)polyol.

In order to facilitate ring-opening polymerization, a catalyst such as an organic titanium-based compound, an organic tin-based compound, or a metal salt of organic carbonic acid is used. The titanium-based compound includes tetrapropyltitanate.

The amount of the catalyst is 0.001 to 0.5 parts by weight on the basis of 1 part by weight of the lactone compound. When the amount of catalyst is out of this range, it is not preferable for reactivity of ring-opening polymerization.

The ring-opening polymerization can be carried out in either the presence or absence of an organic solvent. The organic solvent includes an aromatic compound, a saturated hydrocarbon compound, etc. The organic solvent is used in an amount of 1 to 50 parts by weight, and preferably 2 to 10 parts by weight, on the basis of 1 part by weight of (polyester)polyol.

Through the esterification as above, a poly(ester)(metha)acrylate or a polymer thereof, wherein a portion of, or the whole of, at least three hydroxyl groups of the (polyester)polyol is substituted with (metha)acrylic ester, and the remaining portion of the hydroxyl groups that is unsubstituted with (metha)acrylic ester is substituted with a group having no radical reactivity, is obtained.

The (metha)acrylic ester is represented —OC(=O)(CH$_2$)$_n$OC(=O)CH=CH$_2$ or —OC(=O)(CH$_2$)$_n$OC(=O)C(CH$_3$)=CH$_2$ (n is an integer of 1 to 20, preferably 1 to 6).

The group having no radical reactivity is a $C_1$ to $C_{20}$ aliphatic hydrocarbon, a $C_5$ to $C_{20}$ aromatic hydrocarbon, a $C_1$ to $C_{20}$ ether, or a $C_1$ to $C_{20}$ ester, and preferably —OC(=O)(CH$_2$)$_3$CH$_3$, —OC(=O)Ar (wherein Ar is an unsubstituted or substituted aromatic hydrocarbon), —OC(=O)(CH$_2$)$_n$O(CH$_2$)$_n$CH$_3$ (n is an integer ranging from 1 to 20), —O(C=O)(CH$_2$)$_n$OC(=O)(CH$_2$)$_n$CH$_3$ (n is an integer ranging from 1 to 20), or —(C=O)CH=CH$_2$.

For example, a (metha)acrylic acid or a derivative thereof and the group having no radical reactivity are preferably used in a mole ratio of 1:0.01 to 1:100, more preferably 1:0.5 to 1:3.

The poly(ester)(metha)acrylate or polymer thereof preferably has a weight average molecular weight in the range of 300 to 100,000, and more preferably 100 to 10,000. The poly(ester)(metha)acrylate or polymer thereof is present in a liquid state, and it inhibits gas generation inside the battery. The poly(ester)(metha)acrylate or polymer thereof is also a monomer to form a gel when being used along with a polymerization initiator.

A preferable poly(ester)(metha)acrylate or polymer thereof is represented by the Formula (5):

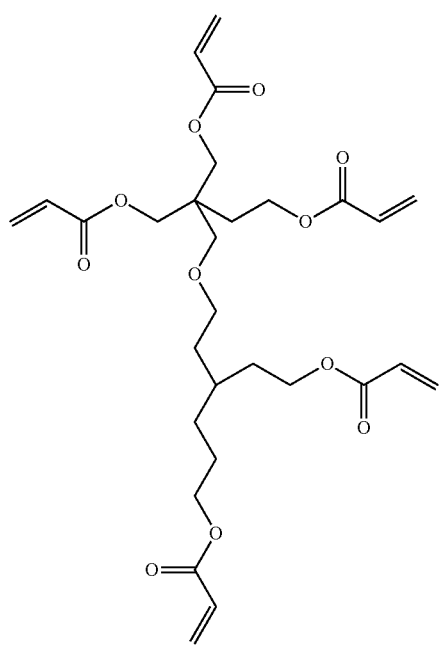

(5)

The poly(ester)(metha)acrylate or polymer thereof is preferably used in an amount of 0.1 to 5 wt % of the total electrolyte. When the amount is less than 0.1 wt %, the addition effect is not sufficient, and when the amount is more than 5 wt %, cycle life characteristics are deteriorated.

The electrolyte of the present invention may include an organic peroxide. The organic peroxide can inhibit swelling of the battery resulting from gas generation at an elevated temperature by polymerizing the poly(ester)(metha)acrylate when the temperature of the battery increases. The poly(ester)(metha)acrylate or polymer thereof can be polymerized to form a gel polymer electrolyte by being subjected to heat in the range of 40 to 110° C., or UV radiation. The gel polymer electrolyte can optimize the retention of electrolyte liquid, and does not inhibit mobility of lithium ions, resulting in establishment of effective battery performance.

The organic peroxide has a polar (hydrophilic) region of —C(=O)—O—C(=O)—and a nonpolar (hydrophobic) region of a $C_6$ to $C_{40}$ aliphatic or aromatic hydrocarbon. The organic peroxide plays a role of a surfactant between the electrolyte and the negative electrode, particularly a carbonaceous negative electrode, to reduce resistance at the surface of the negative electrode, resulting in inhibition of electrolyte decomposition at the surface of the negative electrode.

The organic peroxide used as a polymerization initiator of the present invention generates $CO_2$ gas, which has effective affinity with the electrolyte to improve the initial charge-discharge efficiency, whereas a conventional polymerization azobenzene initiator such as 2,2'-azobisbutyronitrile (AIBN) generates nitrogen gas ($N_2$), which has no solubility in a polar electrolyte solution.

The initial charge-discharge efficiency of a lithium battery has a relationship with the coating layer formed on the surface of electrodes, particularly the negative electrode. The coating layer determines most of the battery performance, for example, the initial charge-discharge efficiency. When effective initial charge-discharge is realized, the surface of the negative electrode in a charge state is uniform. However, when ineffective initial charge-discharge is realized, a large amount of lithium is deposited on the surface of the negative electrode.

The organic peroxide is preferably a $C_6$ to $C_{40}$ peroxide. A preferred example of the organic peroxide is one of isobutyl peroxide, lauroyl peroxide, benzoyl peroxide, m-toluoyl peroxide, t-butylperoxy-2-ethyl hexanoate, t-butyl peroxy bibarate, t-butyloxyneodecanate, diisopropyl peroxy dicarbonate, diethoxy peroxy dicarbonate, bis-(4-t-butylcyclohexyl)peroxy dicarbonate, dimethoxy isopropyl peroxy dicarbonate, dicyclohexylperoxy dicarbonate, and 3,3,5-trimethylhexanoyl peroxide. However, benzoyl peroxide and lauroyl peroxide are more preferable. The lauroyl peroxide is represented by the Formula (6).

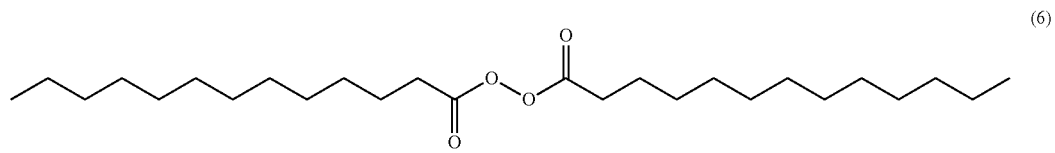

(6)

When lauroyl peroxide is used as a polymerization initiator, the coating layer on the negative electrode is a lithium carbonate layer which is produced by the following scheme 1:

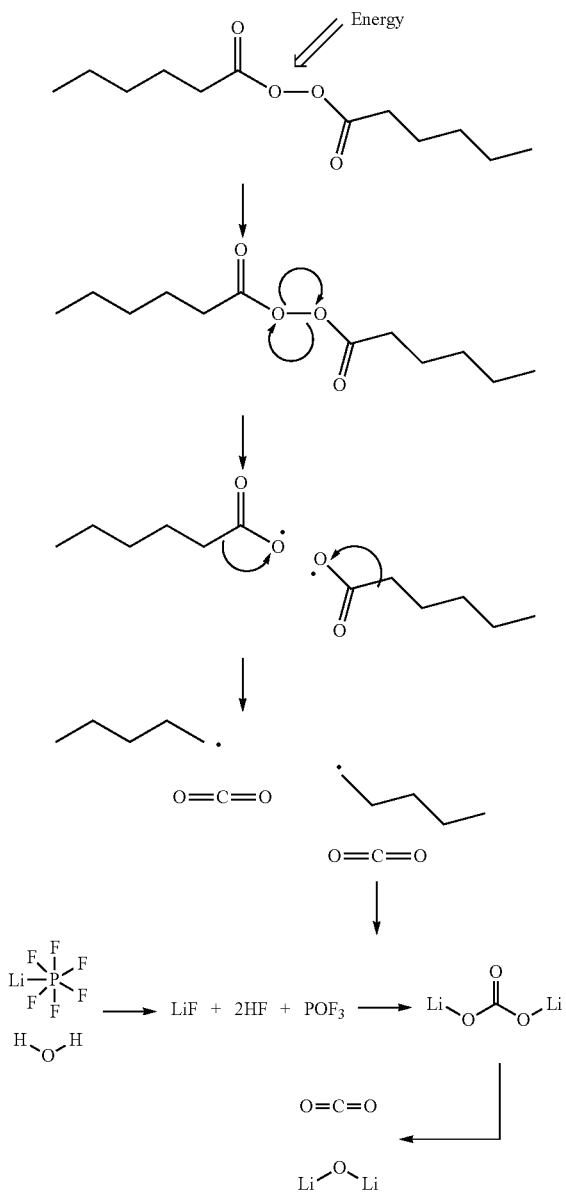

As shown in the above scheme 1, lauroyl peroxide is decomposed to generate $CO_2$ gas, and then the $CO_2$ gas forms a lithium carbonate ($Li_2CO_3$) coating layer on the negative electrode. Such a coating layer inhibits decomposition of the electrolyte on the negative electrode during initial charge, and therefore it is not necessary to remove the gas generated from the decomposition of the electrolyte thereafter. If the coating layer is stably formed on the negative electrode, the decomposition of the electrolyte is inhibited after the charge/discharge cycle is repeated, and the electrode is very stable, preventing swelling of the battery during storage at an elevated temperature.

The organic peroxide is used in an amount of 0.3 to 5 parts by weight on the basis of 100 parts by weight of poly(ester)(metha)acrylate. When the amount is less than 0.3 parts by weight, the polymerization reactivity decreases, and when the amount is more than 5 parts by weight, the molecular weight of the polymer cannot grow, resulting in deterioration of the mechanical properties of the polymer electrolyte.

The electrolyte additive, as described above, is added to a non-aqueous organic solvent including a lithium salt. The lithium salt acts as a supply source of lithium ions in the battery, making the basic operation of a lithium battery possible. The non-aqueous organic solvent plays a role of a medium wherein ions capable of participating in the electrochemical reaction are mobilized.

The lithium salt is preferably at least one selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (wherein x and y are natural numbers), LiCl, and LiI.

The concentration of the lithium salt preferably ranges from 0.6 to 2.0 M, more preferably 0.7 to 1.6 M. When the concentration of the lithium salt is less than 0.6 M, the electrolyte performance deteriorates due to its ionic conductivity. When the concentration of the lithium salt is greater than 2.0 M, the lithium ion mobility decreases due to an increase of the electrolyte viscosity.

The non-aqueous organic solvent may include a carbonate, an ester, an ether, or a ketone. Examples of carbonates include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), and butylene carbonate (BC). Examples of esters include n-methyl acetate, n-ethyl acetate, n-propyl acetate, etc.

It is preferable to use a mixture of a chain carbonate and a cyclic carbonate. The cyclic carbonate and the chain carbonate are preferably mixed together in a volume ratio of 1:1 to 1:9. When the cyclic carbonate and the chain carbonate are mixed in the volume ratio of 1:1 to 1:9, and the mixture is used as an electrolyte, the electrolyte performance may be enhanced.

In addition, the electrolyte of the present invention may further include mixtures of the carbonate solvents and aromatic hydrocarbon solvents of Formula (7):

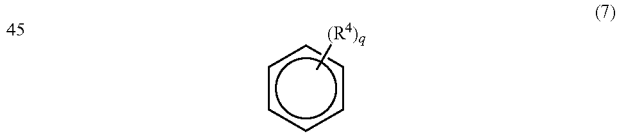

(7)

wherein $R^4$ is a halogen or a $C_1$ to $C_{10}$ alkyl, and q is an integer of 1 to 6.

Examples of aromatic hydrocarbon solvents include benzene, chlorobenzene, nitrobenzene, fluorobenzene, toluene, trifluorotoluene, and xylene. The carbonate solvents and the aromatic hydrocarbon solvents are preferably mixed together in a volume ratio of 1:1 to 30:1. When a carbonate solvent and an aromatic hydrocarbon solvent are mixed with each other in the aforementioned volume ratio, and the mixture is used as an electrolyte, the electrolyte performance may be enhanced.

The electrolyte of the present invention may be a polymer electrolyte, which is prepared by adding a compound of Formula (1), a poly(ester)(metha)acrylate or a polymer thereof, and an organic peroxide to a lithium salt containing an organic solution and carrying out polymerization. Hereinafter, the process for preparing a polymer electrolyte is explained in detail.

First, the compound of Formula (1), a poly(ester)(metha) acrylate or a polymer thereof, and optionally an organic peroxide are added to a lithium salt containing an organic solution to prepare a composition for a polymer electrolyte, and the composition is impregnated or coated on a current collector.

The impregnated or coated current collector is subjected to heat-treatment or UV radiation in order to carry out polymerization. A base catalyst may be added to the composition to facilitate a polymerization reaction. As the base catalyst, the base catalyst used in esterification of the (polyester)polyol can be used.

The heat-treatment temperature is determined by a half-life of a radical reaction of the initiator, and is preferably in the range of 40 to 110° C., more preferably 60 to 85° C. When the temperature is too low, many unreactive monomers remain, and it takes too much time to carry out the polymerization reaction. When the temperature is too high, it is not preferable since decomposition of the lithium salt increases.

The present invention provides a lithium battery comprising the electrolyte. The lithium battery of the present invention uses a material that is capable of reversible intercalation/deintercalation of the lithium ions (lithiated intercalation compound) or a material that is capable of forming a lithium-containing compound reversibly as a positive active material, and a lithium metal, or a carbonaceous material that is capable of reversible intercalation/deintercalation of the lithium ions as a negative active material.

A lithium secondary battery is prepared by the following process: the compound of Formula (1), a poly(ester)(metha) acrylate or a polymer thereof, and optionally an organic peroxide are added to a lithium salt-containing organic solution to prepare a composition for a polymer electrolyte; a separator and an insulating resin with a network structure are interposed between a negative electrode and a positive electrode that are fabricated by a conventional process, and the whole is wound or stacked to fabricate an electrode assembly; then, the electrode assembly is inserted into a battery case followed by sealing. The separator is a polyethylene or polypropylene monolayered separator, a polyethylene/polypropylene double layered separator, a polyethylene/polypropylene/polyethylene three layered separator, or a polypropylene/polyethylene/polypropylene three layered separator. A cross-sectional structure of the lithium battery prepared by the above process is shown in FIG. 1.

When an organic peroxide is added to a composition for forming an electrolyte, it is preferable that the fabricated battery is subjected to heat-treatment or UV radiation to prepare a solid polymer electrolyte by inducing polymerization. The heat-treatment is preferably carried out at the temperature of 40 to 110° C., more preferably 60 to 85° C.

Alternatively, a solid polymer electrolyte battery is prepared by the following process: the compound of Formula (1), a poly(ester)(metha)acrylate or a polymer thereof, and optionally an organic peroxide are added to a lithium salt-containing organic solution to prepare a composition for a polymer electrolyte; the composition is coated on a current collector; heat-treatment or UV radiation is carried out to perform polymerization; the polymerized polymer electrolyte is peeled off from the current collector to obtain a polymer electrolyte with a film shape (where the film thickness is preferably 5 to 90 μm, a thickness range where ionic conductivity of the polymer electrolyte is improved); the polymer electrolyte film is interposed between a negative electrode and a positive electrode that are fabricated by a conventional process to fabricate an electrode assembly; and the electrode assembly is inserted into a battery case followed by sealing. A separator and an insulating resin with a network structure may be interposed between the negative electrode and the positive electrode.

The electrolyte of the present invention can be applied to all types of lithium batteries, including a lithium primary battery and a lithium secondary battery. The lithium secondary battery can realize effective electrochemical properties, particularly cycle life characteristics, as well as inhibition of swelling from gas generation and significant overcharge properties compared with a conventional non-aqueous electrolyte.

The following Examples further illustrate the present invention in detail, but are not to be construed to limit the scope thereof.

Example 1

1 mole of dipentaerythritol and 2 moles of ε-caprolactone were added to a toluene solvent, a tetrapropyltitanate catalyst was added in an amount of 0.01 wt %, and then reaction was carried out at 50° C. to synthesize a dipentaerythritol monomer wherein a portion of hydroxyl groups was substituted with ε-caprolactone. 1 mole of the dipentaerythritol monomer, 4 moles of acrylic acid, and 2 moles of butylcarbonic acid were reacted to obtain a polyester hexaacrylate compound where four hydroxyl (—OH) groups of the monomer were substituted with —OC(=O)(CH$_2$)$_5$OC(=O)CH=CH$_2$ and two hydroxyl (—OH) groups were substituted with —OC(=O)(CH$_2$)$_3$CH$_3$.

Ethylene carbonate (EC)/ethyl methyl carbonate (EMC)/propylene carbonate (PC)/fluorobenzene (FB) were mixed in a volume ratio of 30/55/5/10 in order to prepare an organic mixed solvent. 1.15 M LiPF$_6$ were added to the solvent, and an electrolyte additive including 3 wt % of chloroanisole and 3 wt % of the polyester hexaacrylate compound synthesized as above, based on the total weight of the electrolyte, was further added to the solution to prepare a composition to form an electrolyte.

LiCoO$_2$ having an average particle diameter of 10 μm as a positive active material, Super P (acetylene black) as a conductive agent, and polyvinylidenefluoride (PVdF) as a binder were mixed in a weight ratio of 94:3:3 in N-methyl-2-pyrrolidone (NMP) to prepare a positive slurry. The slurry was coated on an aluminum foil, dried, and compressed by a roll press, thus manufacturing a positive electrode having a width of 4.9 cm and a thickness of 147 μm. Mesocarbon fiber (MCF from PETROCA company) as a negative active material, oxalic acid, and PVdF as a binder were mixed in a weight ratio of 89.8:0.2:10 to prepare a negative slurry. The slurry was coated on a copper foil, dried, and compressed by a roll press, thus manufacturing a negative electrode having a width of 5.1 cm and a thickness of 178 μm. Between the manufactured positive and negative electrodes, a polyethylene porous film separator having a width of 5.35 cm and a thickness of 18 μm was interposed followed by winding and placing into prismatic cans. 2.9 g of the electrolyte prepared as above were injected into the cans, thus completing the fabrication of the prismatic-type lithium secondary battery cell.

Example 2

A lithium secondary battery cell was prepared in the same manner as in Example 1, except that 0.03 wt % of lauroyl peroxide was further added, based on the total weight of electrolyte to prepare a composition to form an electrolyte.

Example 3

A lithium secondary battery cell was prepared in the same manner as in Example 1, except that 1.15 M LiPF$_6$ and an electrolyte additive including 5 wt % of chloroanisole based on the total weight of electrolyte were added to a mixed solvent of ethylene carbonate (EC)/ethyl methyl carbonate (EMC)/propylene carbonate (PC)/fluorobenzene in a volume ratio of 30/55/5/10 to prepare a composition to form an electrolyte.

Example 4

A lithium secondary battery cell was prepared in the same manner as in Example 1, except that 1.15 M LiPF$_6$ and an electrolyte additive including 3 wt % of chloroanisole and 0.5 wt % of vinyl sulfone based on the total weight of electrolyte were added to a mixed solvent of ethylene carbonate (EC)/ethyl methyl carbonate (EMC)/propylene carbonate (PC)/fluorobenzene in a volume ratio of 30/55/5/10 to prepare a composition to form an electrolyte.

Example 5

A lithium secondary battery cell was prepared in the same manner as in Example 2, except that the battery cell prepared in Example 2 was heat-treated at 70° C. for two hours in order to polymerize the polyester of the hexaacrylate compound thermally.

Comparative Example 1

A lithium secondary battery cell was prepared in the same manner as in Example 1, except that 1.15 M LiPF$_6$ were added to a mixed solvent of ethylene carbonate (EC)/ethyl methyl carbonate (EMC)/propylene carbonate (PC)/fluorobenzene in a volume ratio of 30/55/5/10 to prepare a composition to form an electrolyte.

Comparative Example 2

A lithium secondary battery cell was prepared in the same manner as in Example 1, except that 1.15 M LiPF$_6$ and an electrolyte additive including 5 wt % of biphenyl based on the total weight of electrolyte were added to a mixed solvent of ethylene carbonate (EC)/ethyl methyl carbonate (EMC)/propylene carbonate (PC)/fluorobenzene in a volume ratio of 30/55/5/10 to prepare a composition to form an electrolyte.

Comparative Example 3

A lithium secondary battery cell was prepared in the same manner as in Example 1, except that 1.15 M LiPF$_6$ and an electrolyte additive including 5 wt % of o-terphenyl based on the total weight of electrolyte were added to a mixed solvent of ethylene carbonate (EC)/ethyl methyl carbonate (EMC)/propylene carbonate (PC)/fluorobenzene in a volume ratio of 30/55/5/10 to prepare a composition to form an electrolyte.

Comparative Example 4

A lithium secondary battery cell was prepared in the same manner as in Example 1, except that polyethyleneglycol dicarylate was used instead of the polyester hexaacrylate compound to prepare a composition to form an electrolyte.

Comparative Example 5

A lithium secondary battery cell was prepared in the same manner as in Example 1, except 0.03 wt % of 2,2'-azobisisobutyronitrile was further added based on the total weight of electrolyte to prepare a composition to form an electrolyte.

The prismatic lithium secondary battery cells of Examples 1-4 and Comparative Examples 1-3 were charged and discharged at 2 C for 7 hours for formation of the batteries, and the thickness of the cells was measured. Also, after the batteries were placed at 90° C. for 4 hours and 60° C. for one month respectively, the thickness of the cells was measured. The measurement results of Examples 1 to 4 and Comparative Examples 1 to 3 are shown in Table 1.

TABLE 1

| | Thickness of batteries (mm) | | | |
|---|---|---|---|---|
| | Before formation | After formation | After storage of 90° C. for 4 hours | After storage of 60° C. for 1 month |
| Example 1 | 5.99 | 6.01 | 6.10 | 6.12 |
| Example 2 | 6.01 | 6.02 | 6.07 | 6.10 |
| Example 3 | 6.01 | 6.05 | 6.30 | 6.32 |
| Example 4 | 6.00 | 6.00 | 6.10 | 6.12 |
| Comparative Example 1 | 6.02 | 6.52 | 6.70 | 6.90 |
| Comparative Example 2 | 6.01 | 6.53 | 6.95 | 7.00 |
| Comparative Example 3 | 6.00 | 6.75 | 7.10 | 7.20 |

Figure 2:
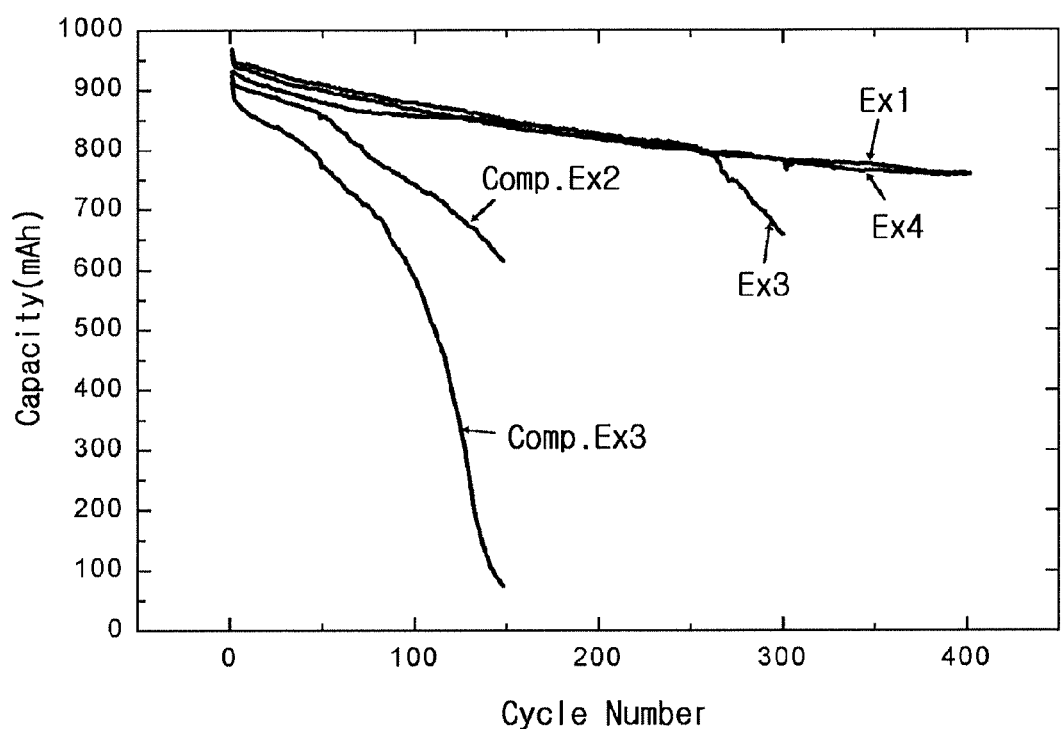
FIG. 2 is a graph illustrating cycle life characteristics of the battery cells according to Examples 1, 3, and 4 of the present invention, and Comparative Examples 2 and 3.

Capacity of battery cells of Examples 1-4 and Comparative Examples 1-3 were measured by charging the batteries at a 2 C rate. Cycle life characteristics at room temperature of the battery cells of Examples 1-4 and Comparative Examples 1-3 were evaluated by 400 cycles of charge/discharge. During the cycle life measurements, the batteries were charged at 1 C to a cut-off voltage of 4.2 V under constant current and constant voltage (CC-CV), and then discharged at 1 C to a cut-off voltage of 2.5 V. The results of capacity and cycle life measurements of Examples 1 to 4 and Comparative Examples 1 to 3 are shown in Table 2. Also, cycle life characteristics of Examples 1, 3, and 4 and Comparative Examples 2 and 3 are shown in FIG. 2. The results of Table 2 and FIG. 2 indicate that the capacity and the cycle life characteristics of Examples 1 to 4 were significantly improved over those of Comparative Examples 1-3.

To evaluate safety during overcharge, 10 lithium secondary battery cells of each of Examples 1 to 4 and Comparative Examples 1 to 3 were fabricated. The cells were charged at 1 C (900 mA of charge current) to a cut-off voltage of 4.2 V, and further fully charged for 3 hours at a constant voltage of 4.2 V. Such fully charged lithium secondary battery cells were then overcharged at 1 C (900 mA of charge current) for 2.5 hours to evaluate overcharge safety. The results are shown in Table 2.

TABLE 2

| | Standard capacity (mAh) | Capacity at 2 C (mAh) | Overcharge safety* | Retention rate of capacity (%) |
|---|---|---|---|---|
| Example 1 | 960 | 910 | 10L0 | 85 |
| Example 2 | 965 | 905 | 10L0 | 84 |
| Example 3 | 962 | 915 | 10L0 | 82 |
| Example 4 | 970 | 920 | 10L0 | 85 |
| Comparative Example 1 | 958 | 910 | 5L4, 5L5 | 82 |

TABLE 2-continued

| | Standard capacity (mAh) | Capacity at 2 C (mAh) | Overcharge safety* | Retention rate of capacity (%) |
|---|---|---|---|---|
| Comparative Example 2 | 930 | 890 | 3L3, 5L4, 2L5 | 81 |
| Comparative Example 3 | 920 | 870 | 5L3, 3L4, 2L2 | 70 |

*Note:
The number preceding "L" indicates the number of tested cells.

The results of the safety test were rated as follows:

L0: effective, L1: leakage, L2: flash, L2: flame, L3: smoke, L4: ignition, L5: explosion.

As shown in Table 2, the capacity, the cycle life, and the overcharge safety of Examples 1-4 were better than those of the Comparative Examples 1-3.

Figure 3A:
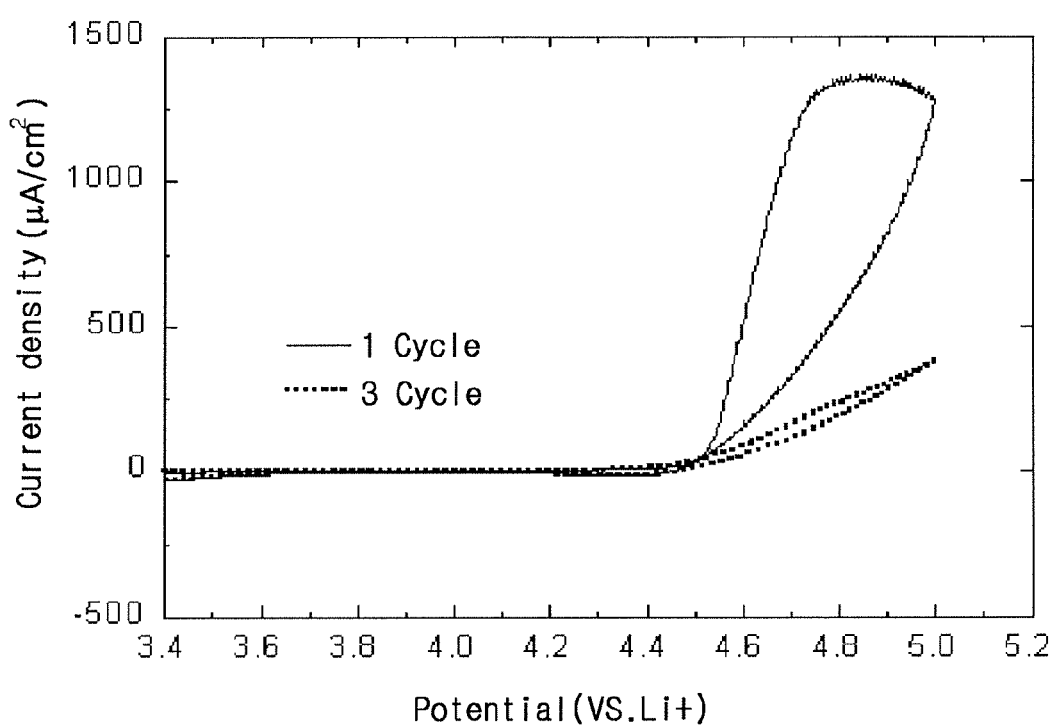
FIGS. 3A and 3B are graphs illustrating cyclic voltammograms of the battery cells according to Example 3 of the present invention and Comparative Example 2, respectively.
Figure 3B:
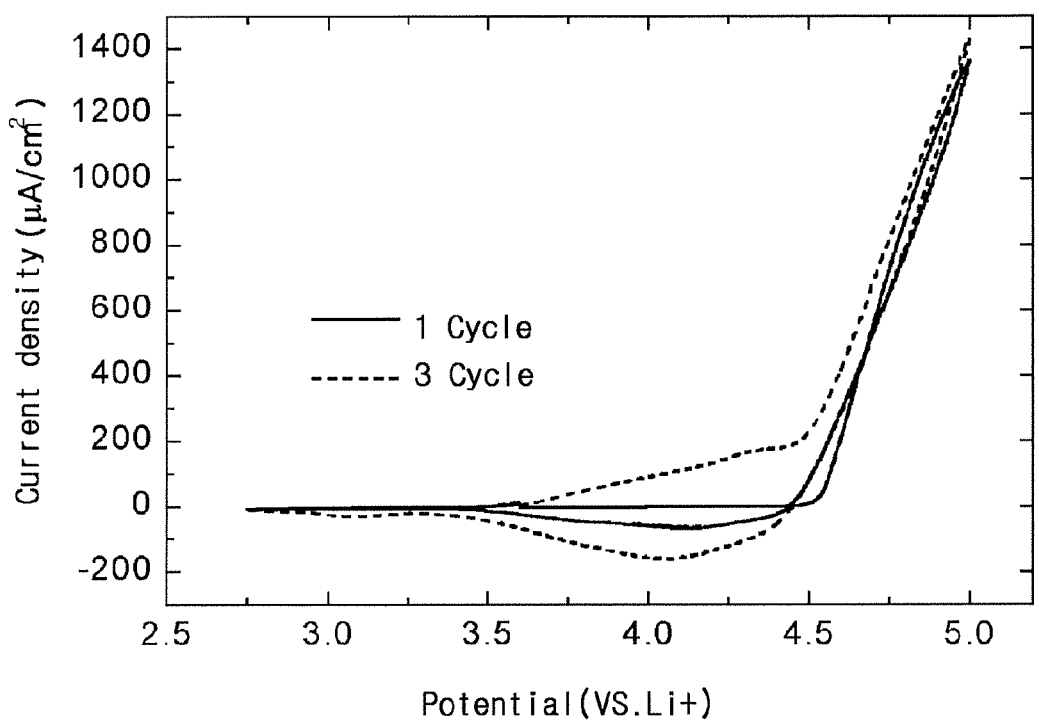

Cyclic voltammograms of the cells of Examples 1-4 and Comparative Examples 1-3 were studied. The cyclic voltammograms were measured in the voltage range of 2.75 V to 5.0 V at a scanning rate of 10 mV/sec. Lithium metal was used as the counter electrode, and a platinum electrode was used between the working electrode and the counter electrode in the cell. FIGS. 3A and 3B show the results of Example 3 and Comparative Example 2, respectively.

Figure 4A:
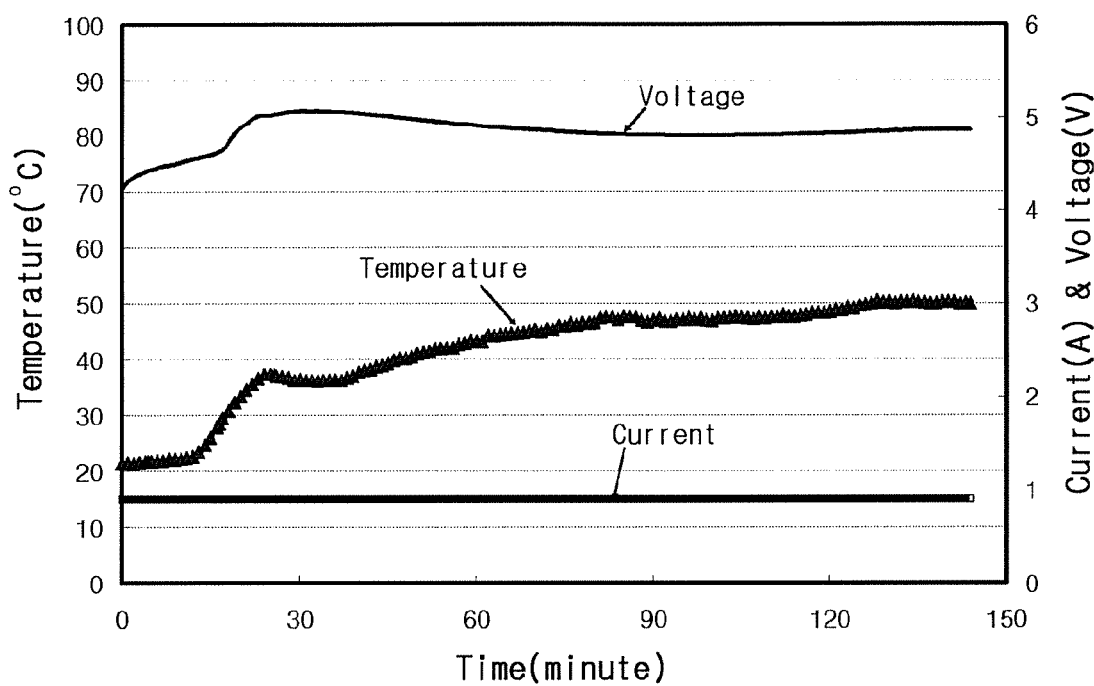
FIGS. 4A to 4C are graphs illustrating charge current and voltage and cell temperature of battery cells according to Example 3 of the present invention and Comparative Examples 1 and 2, respectively.
Figure 4B:
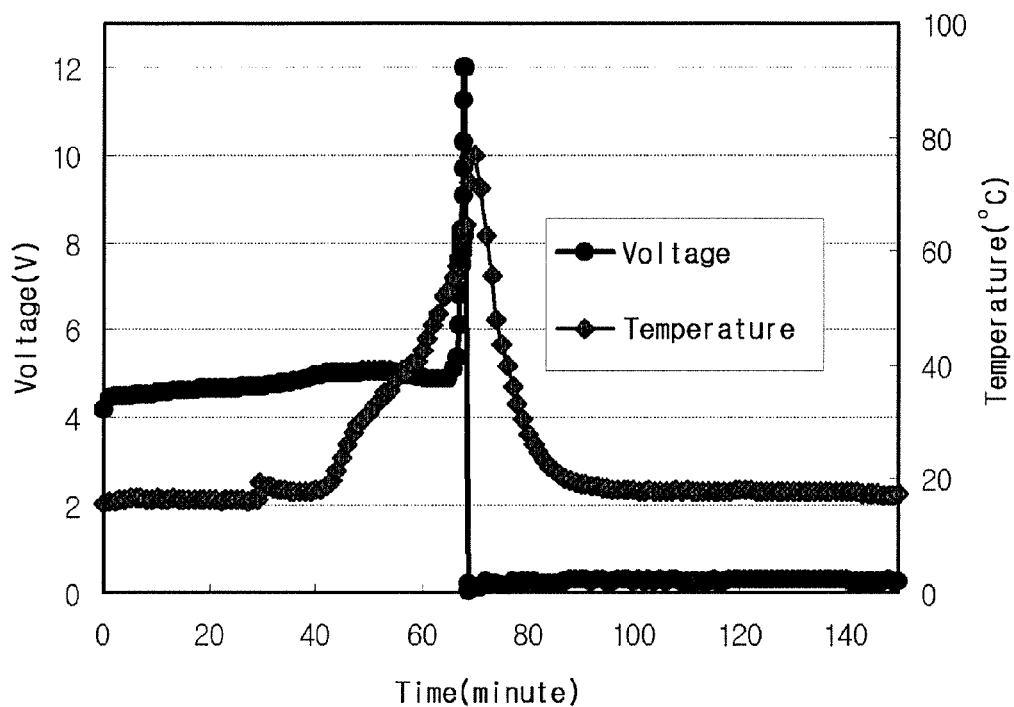
Figure 4C:
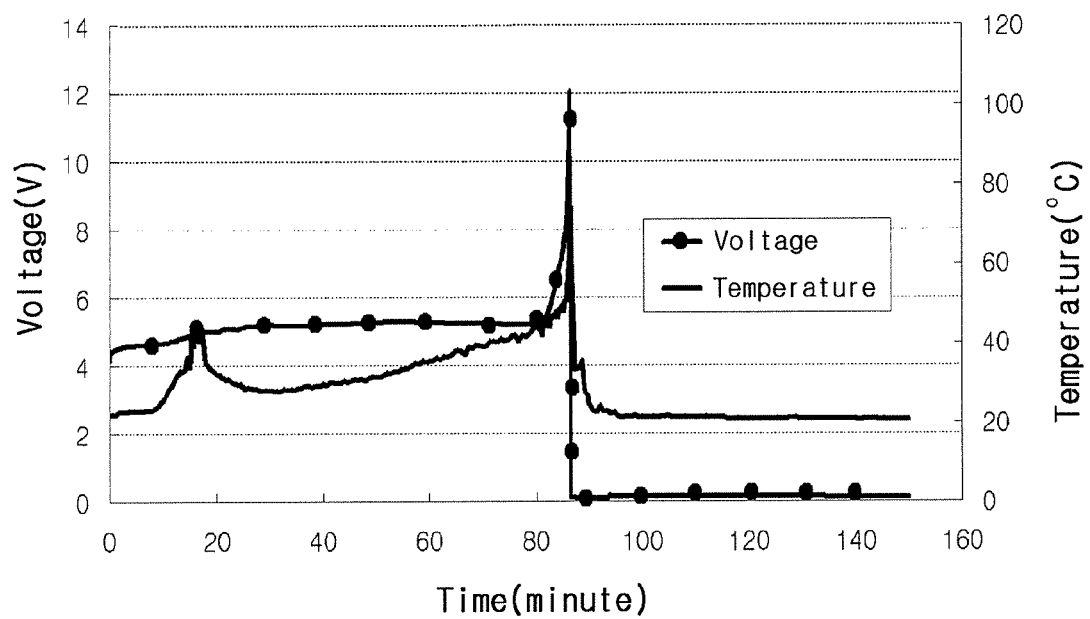

FIGS. 4A, 4B, and 4C show the current, the temperature, and the voltage of the cells of Example 3 and Comparative Examples 1 and 2, respectively, when overcharging to 12 V at 1 C. As shown in FIG. 4A, the temperature of the cell of Example 3 increased slowly after about 5 minutes had lapsed after starting the charge, and a voltage of 4.9 V was maintained safely at an overcharge current of 12 V without occurrence of a short circuit. This resulted because the electrolyte additive consumed the overcharge current. As shown in FIGS. 4B and 4C, the temperature rose abruptly, and the voltage dropped to 0 V at 12 V overcharging.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. An electrolyte for a lithium battery, comprising:
   a non-aqueous organic solvent;
   a lithium salt; and
   an additive comprising a) a compound represented by the following Formula (1), and b) a compound selected from the group consisting of a sulfone-based compound, a poly(ester)(meth)acrylate, a polymer of a poly(ester)(meth)acrylate, and a mixture thereof:

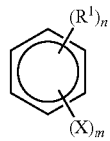

(1)

wherein $R^1$ is a $C_1$ to $C_{10}$ alkyl, a $C_1$ to $C_{10}$ alkoxy, or a $C_6$ to $C_{10}$ aryl, X is halogen, and m and n are integers ranging from 1 to 5, where m+n is less than or equal to 6, and
   wherein the electrolyte further comprises an organic peroxide, and
   wherein the non-aqueous organic solvent is at least one selected from the group consisting of a carbonate, an ester, an ether, and a ketone.

2. The electrolyte for a lithium battery according to claim 1, wherein the carbonate is selected from the group consisting of dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), and butylene carbonate (BC).

3. The electrolyte for a lithium battery according to claim 1, wherein the electrolyte comprises a mixed solvent of a cyclic carbonate and a chain carbonate.

4. The electrolyte for a lithium battery according to claim 1, wherein the electrolyte comprises a mixed solvent of a carbonate solvent and an aromatic hydrocarbon solvent.

5. The electrolyte for a lithium battery according to claim 4, wherein the aromatic hydrocarbon solvent is a compound of Formula (7):

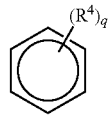

(7)

where $R^4$ is a halogen or a $C_1$ to $C_{10}$ alkyl, and q is an integer of 1 to 6.

6. The electrolyte for a lithium secondary battery according to claim 4, wherein the aromatic hydrocarbon solvent is at least one selected from the group consisting of benzene, fluorobenzene, toluene, trifluorotoluene, and xylene.

7. The electrolyte for a lithium secondary battery according to claim 4, wherein the carbonate solvent and the aromatic hydrocarbon solvent are mixed in a volume ratio of 1:1 to 30:1.

* * * * *